United States Patent
Xiong et al.

(10) Patent No.: US 11,481,562 B2
(45) Date of Patent: Oct. 25, 2022

(54) METHOD AND APPARATUS FOR EVALUATING TRANSLATION QUALITY

(71) Applicant: Baidu Online Network Technology (Beijing) Co., Ltd., Beijing (CN)

(72) Inventors: Hao Xiong, Beijing (CN); Ruiqing Zhang, Beijing (CN); Junjie Li, Beijing (CN); Zhongjun He, Beijing (CN); Zhi Li, Beijing (CN); Hua Wu, Beijing (CN); Haifeng Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 220 days.

(21) Appl. No.: 16/894,974

(22) Filed: Jun. 8, 2020

(65) Prior Publication Data
US 2021/0174033 A1  Jun. 10, 2021

(30) Foreign Application Priority Data
Dec. 5, 2019  (CN) .......................... 201911256622.X

(51) Int. Cl.
*G06F 40/51* (2020.01)
*G06F 40/289* (2020.01)
*G06F 40/30* (2020.01)

(52) U.S. Cl.
CPC ............ *G06F 40/51* (2020.01); *G06F 40/289* (2020.01); *G06F 40/30* (2020.01)

(58) Field of Classification Search
CPC ...................................................... G06F 40/51
See application file for complete search history.

(56) References Cited

U.S. PATENT DOCUMENTS

2012/0226492 A1* 9/2012 Tsuboi ................. G06F 40/30
704/9
2015/0286632 A1* 10/2015 Meunier ................ G06F 40/51
704/2

(Continued)

FOREIGN PATENT DOCUMENTS

CN    106997376 A    8/2017
CN    107357783 A    11/2017

(Continued)

OTHER PUBLICATIONS

Papineni, Kishore, et al. "Bleu: a method for automatic evaluation of machine translation." Proceedings of the 40th annual meeting of the Association for Computational Linguistics. 2002. (Year: 2002).*

(Continued)

*Primary Examiner* — Douglas Godbold
(74) *Attorney, Agent, or Firm* — Nixon Peabody LLP

(57) ABSTRACT

Embodiments of the present disclosure relate to a method and apparatus for evaluating a translation quality. The method may include: acquiring a to-be-evaluated translation and a reference translation; inputting the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences; analyzing the to-be-evaluated translation and the reference translation into two syntax trees respectively; calculating a similarity between the two syntax trees as a text similarity between the to-be-evaluated translation and the reference translation; and using a weighted sum of the semantic similarity and the text similarity as a translation quality score.

15 Claims, 6 Drawing Sheets

(56) References Cited

U.S. PATENT DOCUMENTS

| | | | | |
|---|---|---|---|---|
| 2016/0124944 A1* | 5/2016 | Andreoli | ............... | G06F 40/51 |
| | | | | 704/2 |
| 2017/0132217 A1* | 5/2017 | Na | ............... | G06N 3/08 |
| 2019/0278846 A1 | 9/2019 | Xiang | | |
| 2019/0332678 A1* | 10/2019 | Ishida | ............... | G06F 40/216 |

FOREIGN PATENT DOCUMENTS

| | | | |
|---|---|---|---|
| CN | 109062892 | A | 12/2018 |
| CN | 109710915 | A | 5/2019 |
| CN | 110287282 | A | 9/2019 |
| CN | 111027331 | A | 4/2020 |
| JP | 2000148756 | A | 5/2000 |
| JP | 2003114890 | A | 4/2003 |
| JP | 2015170043 | A | 9/2015 |
| JP | 2017097882 | A | 6/2017 |
| KR | 20170053527 | A | 5/2017 |
| WO | 2018131259 | A1 | 7/2018 |

OTHER PUBLICATIONS

Comelles, E. & Asterias, J., "VERTa: a linguistic approach to automatic machine translation evaluation," Lang Resources & Evaluation, 53:57-86, Oct. 15, 2018 (30 pages).
Freitag, M. et al., "APE at Scale and its Implications on MT Evaluation Biases," arXiv preprint arXiv:1904.04790, Apr. 9, 2019 (11 pages).
Guzman F. et al., "Machine Translation Evaluation with Neural Networks," Journal of Computer Speech and Language, Oct. 6, 2017 (45 pages).
Yu, D. et al., "Confidence Estimation for spoken language translation on Round Trip Translation," 7th International Symposium on Chinese Spoken Language Processing 2010, pp. 426-429 (4 pages).
Somers, H., "Round-Trip Translation: What Is It Goof For?" Proceedings of the Australian Language Technology Workshop 2005, pp. 127-133, Dec. 2005 (7 pages).
Hiroki Shimanaka et al.; "Metric for Automatic Machine Translation Evaluation based on Pre-Trained Sentence Embeddings"; JSPS, vol. 26, No. 3, pp. 613-634; Sep. 2019, in Japanese (25 pages).
IPSJ SIG Technical Report, Information Processing Society of Japan, vol. 2019-NL-241 No. 16, pp. 1-8; Aug. 22, 2019, with English translation of relevant paragraphs 2.1 and 2.1.2 (12 pages).

* cited by examiner

METHOD AND APPARATUS FOR EVALUATING TRANSLATION QUALITY

CROSS-REFERENCE TO RELATED APPLICATIONS

This application claims priority to Chinese Application No. 201911256622.X, filed on Dec. 5, 2019 and entitled "Method and Apparatus for Evaluating Translation Quality," the entire disclosure of which is hereby incorporated by reference.

TECHNICAL FIELD

Embodiments of the present disclosure relate to the field of computer technology, and specifically to a method and apparatus for evaluating a translation quality.

BACKGROUND

A traditional automatic translation quality evaluation method generally evaluates a translation using an index such as BLEU (bilingual evaluation understudy) or an METEOR (an automatic metric for machine translation evaluation with improved correlation with human judgments), which focuses on the matching degree between an original text and a target reference translation. For example, the BLEU investigates more on continuous strings, i.e., a matching degree of n-gram. Some indexes such as the METEOR are supplemented on the basis of the BLEU, so that not only the strings with the same text can be matched, but also the strings with different texts but the same semantic expression can be recognized by introducing some additional resources.

However, in a scenario of oral translation, the purpose of translation is not to translate word for word according to the content of a speaker. Sometimes, in order to reduce a delay and adapt to the local culture, a translator usually deletes a part of the content of the speaker, reduces some of the translation having a small amount of information, and gives listeners the core key information as far as possible. In this case, the use of the traditional automatic evaluation method easily leads to a situation where the oral translation has a low score due to too much information not being translated, resulting in an inaccurate evaluation result. For example, when the evaluation is performed using the traditional method, the rate of the translation to the entire content of an interpreter with years of experience is only about 70%, and the acceptability of the translation is lower than 85%.

The traditional translation quality evaluation method has a high labor cost, and at the same time, since the manual evaluation is restricted by the translation levels of different manual evaluators, the evaluation result fluctuates greatly. A reference translation needs to be constructed separately for the scenario of oral translation. Meanwhile, the traditional method cannot distinguish important information in the translation, and the quality of the translation is measured completely according to loyalty.

SUMMARY

Embodiments of the present disclosure provide a method and apparatus for evaluating a translation quality.

In a first aspect, an embodiment of the present disclosure provides a method for evaluating a translation quality, including: In some embodiments, acquiring a to-be-evaluated translation and a reference translation; inputting the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences; analyzing the to-be-evaluated translation and the reference translation into two syntax trees respectively; calculating a similarity between the two syntax trees as a text similarity between the to-be-evaluated translation and the reference translation; and using a weighted sum of the semantic similarity and the text similarity as a translation quality score.

In some embodiments, the method further includes: inputting the to-be-evaluated translation into a pre-trained automatic question-and-answer model to obtain at least one group of questions and answers, the automatic question-and-answer model being a neural network for extracting a question and an answer in a text; determining a proportion of correct answers in the at least one group of questions and answers as a question-and-answer score; acquiring a standard score obtained by performing, by the automatic question-and-answer model, an answering result analysis on a standard translation; correcting the question-and-answer score through the standard score to obtain an intelligibility score of the to-be-evaluated translation; and using a weighted sum of the semantic similarity, the text similarity and the intelligibility score as the translation quality score.

In some embodiments, the method further includes: recognizing key information from the to-be-evaluated translation; comparing the recognized key information with manually annotated key information, and calculating a comprehensive score of an accuracy rate and a recall rate of the key information; and correcting the translation quality score through the comprehensive score.

In some embodiments, the correcting the question-and-answer score through the standard score includes: setting a predetermined constant to smooth a difference between the standard score and the question-and-answer score.

In some embodiments, the repetition coding model is trained by: acquiring a set of original sentences of a first language identical to a language of the to-be-evaluated translation; for each original sentence of the first language in the set of the original sentences of the first language, translating the original sentence of the first language into a translation of a second language through a first translation model, translating the translation of the second language into a repetition sentence of the first language through a second translation model, constituting a repetition sentence pair using the original sentence of the first language and the repetition sentence of the first language, and selecting randomly one sentence to constitute a non-repetition sentence pair using the one sentence and the original sentence of the first language; and using a set of repetition sentence pairs as positive samples and the non-repetition sentence pair as a negative sample, and training a classifier using a machine learning method to obtain the repetition coding model.

In some embodiments, the method further includes: controlling a size of a vocabulary table of the first translation model and a size of a vocabulary table of the second translation model, to generate a variety of repetition sentence pairs.

In some embodiments, a training sample set of the repetition coding model is different from a training sample set of the first translation model, and is also different from a training sample set of the second translation model.

In some embodiments, in response to determining that the to-be-evaluated translation is in a predetermined mainstream language, a BERT model is used as the repetition coding model.

In a second aspect, an embodiment of the present disclosure provides an apparatus for evaluating a translation quality, including: an acquiring unit, configured to acquire a to-be-evaluated translation and a reference translation; a semantics evaluating unit, configured to input the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences; a syntax analyzing unit, configured to analyze the to-be-evaluated translation and the reference translation into two syntax trees respectively; a syntax evaluating unit, configured to calculate a similarity between the two syntax trees as a text similarity between the to-be-evaluated translation and the reference translation; and a calculating unit, configured to use a weighted sum of the semantic similarity and the text similarity as a translation quality score.

In some embodiments, the apparatus further includes an intelligibility evaluating unit, wherein the intelligibility evaluating unit is configured to: input the to-be-evaluated translation into a pre-trained automatic question-and-answer model to obtain at least one group of questions and answers, the automatic question-and-answer model being a neural network for extracting a question and an answer in a text; determine a proportion of correct answers in the at least one group of questions and answers as a question-and-answer score; acquire a standard score obtained by performing, by the automatic question-and-answer model, an answering result analysis on a standard translation; correct the question-and-answer score through the standard score to obtain an intelligibility score of the to-be-evaluated translation; and use a weighted sum of the semantic similarity, the text similarity and the intelligibility score as the translation quality score.

In some embodiments, the apparatus further includes a key information evaluating unit, wherein the key information evaluating unit is configured to: recognize key information from the to-be-evaluated translation; compare the recognized key information with manually annotated key information, and calculate a comprehensive score of an accuracy rate and a recall rate of the key information; and correct the translation quality score through the comprehensive score.

In some embodiments, the intelligibility evaluating unit is further configured to: set a predetermined constant to smooth a difference between the standard score and the question-and-answer score.

In some embodiments, the apparatus further includes a training unit, wherein the training unit is configured to: acquire a set of original sentences of a first language identical to a language of the to-be-evaluated translation; for each original sentence of the first language in the set of the original sentences of the first language, translate the original sentence of the first language into a translation of a second language through a first translation model, translate the translation of the second language into a repetition sentence of the first language through a second translation model, constitute a repetition sentence pair using the original sentence of the first language and the repetition sentence of the first language, and select randomly one sentence to constitute a non-repetition sentence pair using the one sentence and the original sentence of the first language; and use a set of repetition sentence pairs as positive samples and the non-repetition sentence pair as a negative sample, and train a classifier using a machine learning apparatus to obtain the repetition coding model.

In some embodiments, the training unit is further configured to: control a size of a vocabulary table of the first translation model and a size of a vocabulary table of the second translation model, to generate a variety of repetition sentence pairs.

In some embodiments, a training sample set of the repetition coding model is different from a training sample set of the first translation model, and is also different from a training sample set of the second translation model.

In some embodiments, in response to determining that the to-be-evaluated translation is in a predetermined mainstream language, a BERT model is used as the repetition coding model.

In a third aspect, an embodiment of the present disclosure provides an electronic device, the device electronic including: one or more processors; and a storage apparatus, storing one or more programs, where the one or more programs, when executed by the one or more processors, cause the one or more processors to implement any method according to the first aspect.

In a fourth aspect, an embodiment of the present disclosure provides a computer readable medium, storing a computer program thereon, where the computer program, when executed by a processor, implements any method according to the first aspect.

The method and apparatus for evaluating a translation quality provided in embodiments of the present disclosure propose a plurality of new evaluation indexes: (1) performing a semantic similarity evaluation on a translation using a repetition; (2) performing a syntactic structure similarity evaluation on the translation using a syntax tree; (3) performing an information intelligibility evaluation on the translation using an automatic question-and-answer; (4) performing an evaluation using a translation accuracy rate of a key point, for example, a named entity and a key notional word.

By combining the scores of the above indexes, it can be reflected that the current translation is comprehensively evaluated in terms of semantics, syntax, morphology and overall information intelligibility, to avoid a situation that the automatic evaluation score is high but the intelligibility is low. For example, a large number of function words such as "a", "an" and "the" are translated correctly, but the notional words are translated incorrectly, the context is not coherent, and so on.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
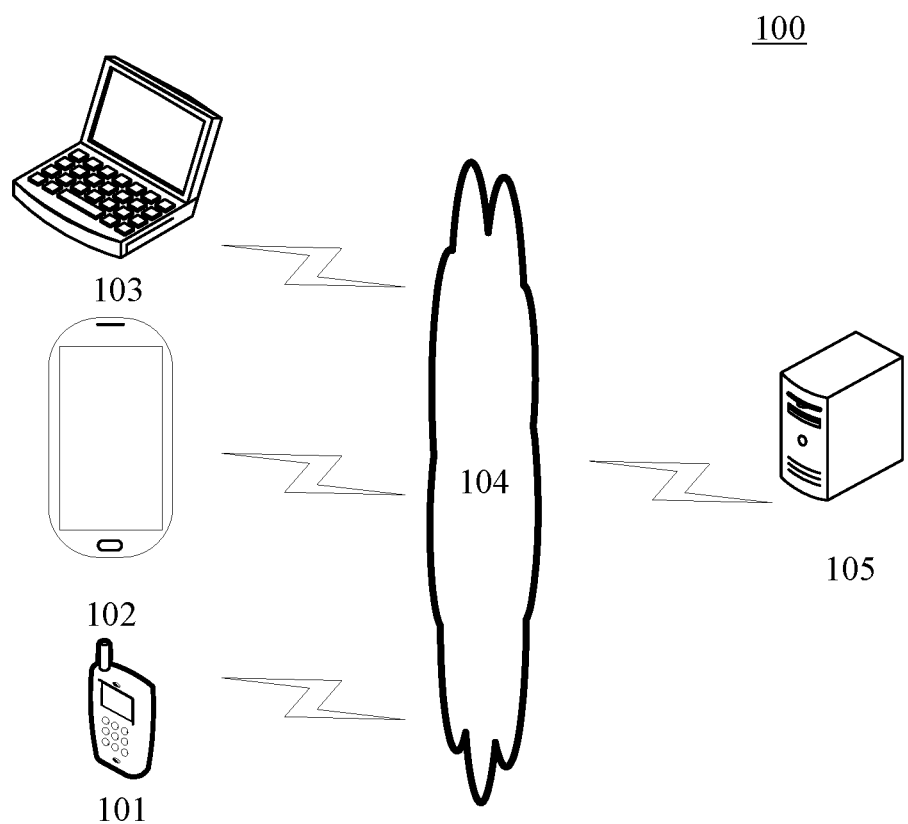
FIG. 1 is a diagram of an example system architecture in which an embodiment of the present disclosure may be implemented.

FIG. 1 illustrates an example system architecture 100 in which a method for evaluating a translation quality or an apparatus for evaluating a translation quality according to embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 by using the terminal devices 101, 102 and 103, to receive or send a message, etc. Various communication client applications (e.g., a translation application, a speech recognition application, a web browser application, a shopping application, a search application, an instant communication tool, a mailbox client and social platform software) may be installed on the terminal devices 101, 102 and 103.

The terminal devices 101, 102 and 103 may be hardware or software. When being the hardware, the terminal devices 101, 102 and 103 may be various electronic devices having a display screen and supporting web page browsing, the electronic devices including, but not limited to, a smart phone, a tablet computer, an e-book reader, an MP3 player (Moving Picture Experts Group Audio Layer III), an MP4 (Moving Picture Experts Group Audio Layer IV) player, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or may be implemented as a single piece of software or a single software module, which will not be specifically defined here.

The server 105 may be a server providing various services, for example, a backend evaluation server that performs translation quality evaluation on a translation uploaded by the terminal devices 101, 102 and 103. The backend evaluation server may perform processing such as analysis on data such as a received evaluation request, and feedback the processing result (e.g., the translation quality score) to the terminal devices.

It should be noted that the server may be hardware or software. When being the hardware, the server may be implemented as a distributed server cluster composed of a plurality of servers, or may be implemented as a single server. When being the software, the server may be implemented as a plurality of pieces of software or a plurality of software modules (e.g., software or software modules for providing a distributed service), or may be implemented as a single piece of software or a single software module, which will not be specifically defined here.

It should be noted that the method for evaluating a translation quality provided in embodiments of the present disclosure may be performed by the terminal devices 101, 102 and 103, or may be performed by the server 105. Correspondingly, the apparatus for evaluating a translation quality may be provided in the terminal devices 101, 102 and 103, or may be provided in the server 105, which will not be specifically defined here.

It should be appreciated that the numbers of the terminal devices, the networks and the servers in FIG. 1 are merely illustrative. Any number of terminal devices, networks and servers may be provided based on actual requirements.

Figure 2:
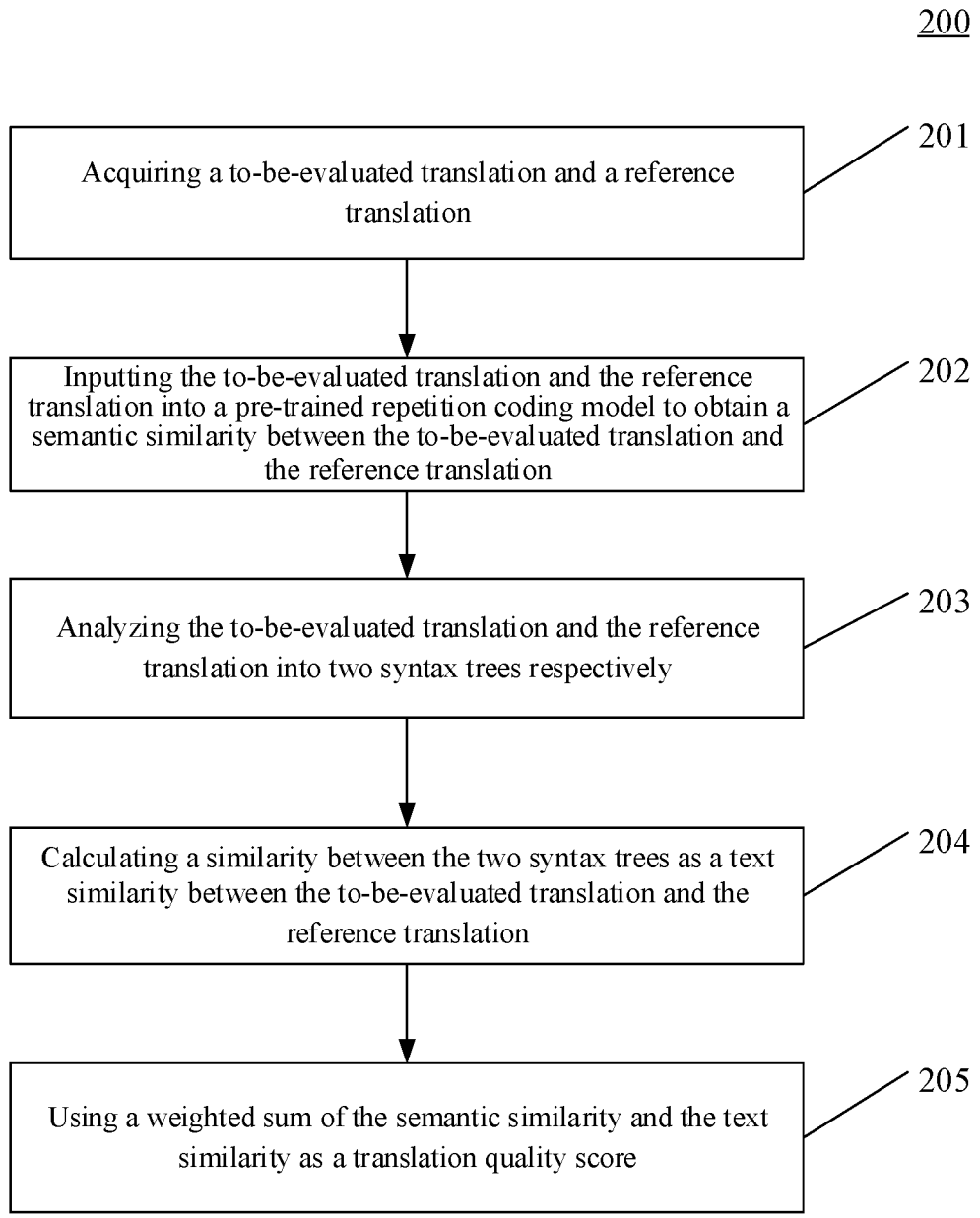
FIG. 2 is a flowchart of a method for evaluating a translation quality according to a first embodiment of the present disclosure.

Further referring to FIG. 2, FIG. 2 illustrates a flow 200 of a method for evaluating a translation quality according to an embodiment of the present disclosure. The method for evaluating a translation quality includes the following steps.

Step 201, acquiring a to-be-evaluated translation and a reference translation.

In this embodiment, an executing body (e.g., the server shown in FIG. 1) of the method for evaluating a translation quality may receive the to-be-evaluated translation and the reference translation from a terminal with which a user performs translation quality evaluation, by means of a wired or wireless connection. The to-be-evaluated translation may be in the form of speech, i.e. an interpretation result, or may be in the form of text. If the translation refers to an oral translation, the translation needs to be converted into a translation in the form of text through a speech recognition technique. The reference translation is a standard translation translated and proofread by a professional, and is in the form of text. If the to-be-evaluated translation is a whole paragraph, the to-be-evaluated translation may be segmented into sentences to perform an evaluation. Then, the average value of the evaluation scores of the sentences is used as the evaluation score for the whole paragraph. When speech recognition is performed, the whole translation may be segmented into sentences according to pause time lengths.

Step 202, inputting the to-be-evaluated translation and the reference translation into a pre-trained repetition coding model to obtain a semantic similarity between the to-be-evaluated translation and the reference translation.

In this embodiment, the repetition coding model is a neural network for calculating a probability of a pair of sentences being repetition sentences (i.e., the semantic similarity between two sentences). The repetition coding model may be a simple binary classification model, and is used to determine a probability of the inputted two sentences being of the same classification, which corresponds to the determination of whether the inputted two sentences have the same semantics. If the to-be-evaluated translation is a whole paragraph, the semantic similarity of each sentence may be obtained by inputting the paragraph into the repetition coding model sentence by sentence. Then, the average value of the semantic similarities of the sentences is calculated as the semantic similarity of the whole paragraph.

First, a repetition coding model needs to be constructed, for example, an English repetition coding model is constructed. The current mainstream method is to re-decode a training sentence pair using a trained machine translation model. For example, the Chinese in the training sentence pair may be automatically translated using the trained Chinese-English translation model, and the obtained translation and the original English may construct a repetition sentence pair. However, this method has a defect that the generated translation may be similar to the original English. Two approaches are used to improve the defect. In an approach a, the English in the training sentence pair is first translated using an English-Chinese model to generate the Chinese, and then the Chinese is translated into the English using the Chinese-English translation model. Meanwhile, in the above process, by controlling the size of the vocabulary table used in the translation model, it may be defined that the generated translation is expressed only by the words in the content of the vocabulary table, and thus, to some extent, a variety of translations are generated. In an approach b, when constructing the translation model, the model is trained through different corpora. For example, when constructing a spoken language repetition sentence pair, the translation model uses a bilingual sentence pair of another training set, to avoid over-fitting in the same training set. The above two approaches may be used at the same time, to as far as possible make the semantics of the generated translation similar to that of the reference translation, but the expressions thereof are different. The above repetition sentence pair is obtained. For example, the repetition sentence is A, and the other sentence is B. If the repetition sentence pair belongs to some mainstream languages such as Chinese and English, BERT (Bidirectional Encoder Representation from Transformers) may be used to perform fine tuning on the training set, and finally the output layer of the BERT is used as a semantic expression. For some rare minor languages, the cost of constructing a pre-trained model for the BERT is high, and thus, a simple classification model may be designed to accomplish the task.

Since the samples contained in the repetition sentence pair are positive, for one sentence, one other sentence may be randomly selected as the negative sample of the one sentence for training. Using the trained model, the output result of the oral translation and the reference translation may be respectively inputted as A and B, and the probability of output softmax classified as 1 is the final semantic similarity score.

Step 203, analyzing the to-be-evaluated translation and the reference translation into two syntax trees respectively.

In this embodiment, the entire translation may be segmented into sentences, and then a syntactic analysis is performed on the sentences. Then, the similarities obtained after the sentences are analyzed and calculated are averaged, to obtain the text similarity of the entire translation. The inputted translation may be analyzed into one syntax tree using a syntax analyzer. A syntax tree is also referred to as a grammar tree. The evaluation method of the syntax tree is simple. For the outputted translation of the model and the reference translation, the syntactic analysis model is used to perform automatic syntax tree generation. After two syntax trees are obtained, the similarity thereof may be calculated in the manner of text. In addition, a node containing a vocabulary may also be removed, to calculate a more precise score using a tree kernel (tree-to-string translation model). For example, the two syntax trees are: NP (NN (Xiaoming)) (VP VB (eats) NN (apple)); NP (NN (apple)) (VP VB (is eaten) PP (by) NN (Xiaoming)).

The semantics expressed by the above two sentences are actually similar, but the syntax tree structures are slightly different. This reflects two different grammatical expressions, the former is an active expression, and the latter is a passive expression. The syntactic similarity of the two sentences is low when a general text matching is performed. After the tree kernel is used, the vocabulary node is removed, and each sentence subtree is enumerated and then the similarity is scored. For example, in the topmost syntax tree, the two sentences have the same structure: NP (NN VP).

The difference lies in that the structure of the first VP is VP (VB NN), and the structure of the second VP is VP (VB PP NN).

Therefore, the similarity between the two syntax trees is not 0 as calculated according to the tree kernel, and the calculation is more precise.

A rule is represented as a characteristic vector, and a similarity between different rules is calculated through a convolution tree kernel. Since the number of rules in a rule table is enormous, it is not feasible to completely calculate the similarities between all the rules. Therefore, a set of candidate rules is first generated through some restrictions, and then, in the set, a similarity is calculated through the convolution tree kernel.

Step 204, calculating a similarity between the two syntax trees as a text similarity between the to-be-evaluated translation and the reference translation.

In this embodiment, a similarity between sentence subtrees may be calculated through a similarity calculation method such as a cosine similarity method. The similarity calculation method is the existing technology, which will not be repeatedly described.

Step 205, using a weighted sum of the semantic similarity and the text similarity as a translation quality score.

In this embodiment, the weighted sum of the similarities calculated through the two methods is used as the translation quality score. The translation quality evaluation result takes into consideration both the semantic similarity and the syntactic structure similarity. The translation quality can be more accurately evaluated. A specific weight setting may be set as needed. For example, if the semantic correctness is emphasized, the weight of the semantic similarity may be set higher than that of the text similarity.

Figure 3:
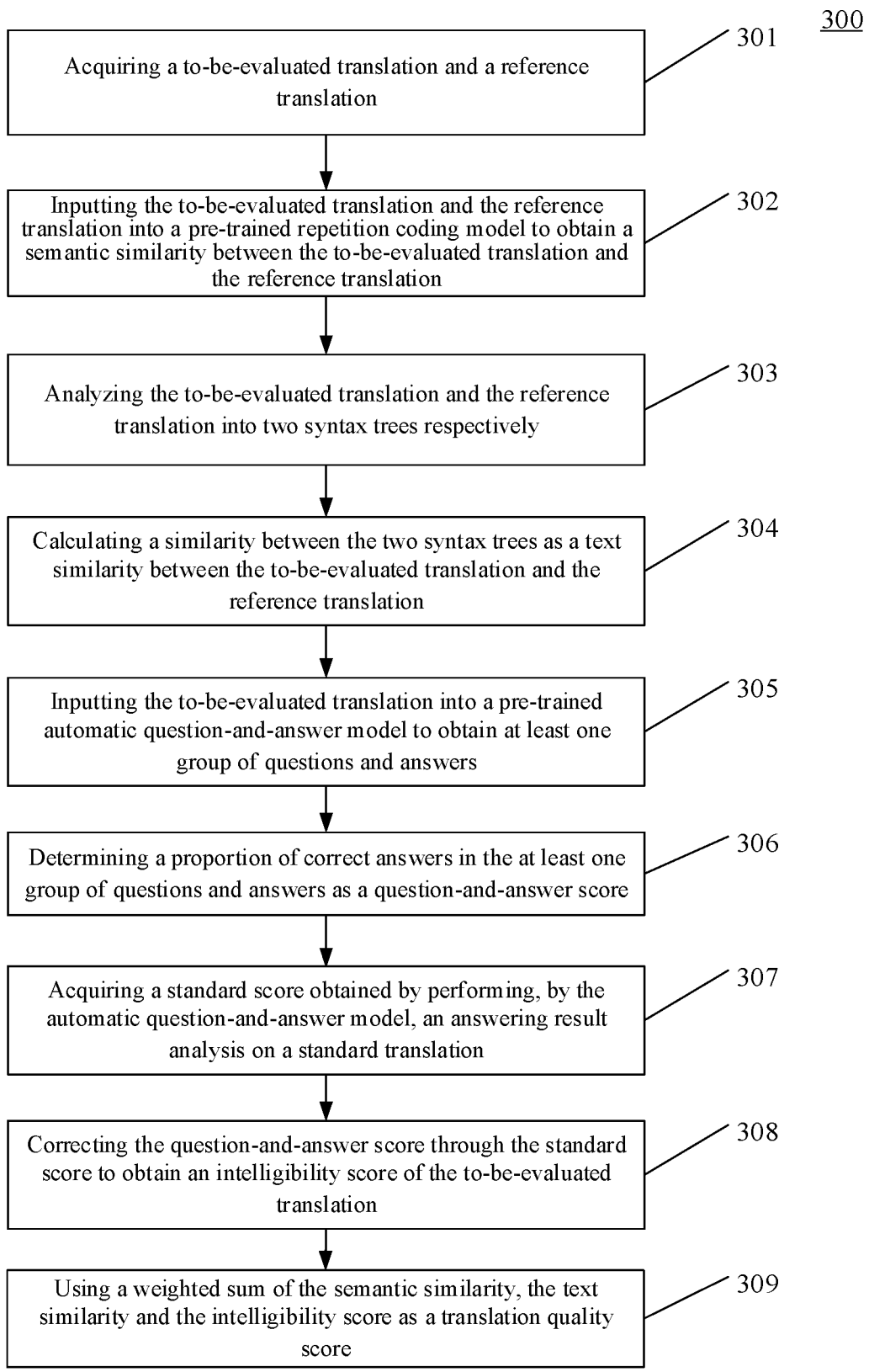
FIG. 3 is a flowchart of a method for evaluating a translation quality according to a second embodiment of the present disclosure.

Further referring to FIG. 3, FIG. 3 illustrates a flow 300 of a second embodiment of the method for evaluating a translation quality. The flow 300 of the method for evaluating a translation quality includes the following steps.

Step 301, acquiring a to-be-evaluated translation and a reference translation.

Step 302, inputting the to-be-evaluated translation and the reference translation into a pre-trained repetition coding model to obtain a semantic similarity between the to-be-evaluated translation and the reference translation.

Step 303, analyzing the to-be-evaluated translation and the reference translation into two syntax trees respectively.

Step 304, calculating a similarity between the two syntax trees as a text similarity between the to-be-evaluated translation and the reference translation.

Steps 301-304 are substantially the same as steps 201-204, which will not be repeatedly described.

Step 305, inputting the to-be-evaluated translation into a pre-trained automatic question-and-answer model to obtain at least one group of questions and answers.

In this embodiment, the automatic question-and-answer model is a neural network for extracting a question and an answer in a text. The evaluation using an automatic question-and-answer approach is an important innovation of the present disclosure. In general, automatic question-and-answer is suitable to evaluate whether a model correctly understands the content of a paragraph. With reference to the application of the automatic question-and-answer in the field of reading comprehension, the automatic question-and-answer is used to evaluate whether the translation contains valid information.

An example is as follows:

| | |
|---|---|
| A modern movie, a modern movie may have 2500 or 3000 kinds of shots, and each shot is a few seconds long and is only a few seconds long. These few seconds require a team composed of dozens of artists and designers, and also require their real movie production time, production time, budget, creation time. | 1. Q: How many kinds of shots can a movie have? A: 2500 or 3000 2. Q: How many seconds per shot? A: A few seconds 3. Q: What team does each shot need to be produced? A: Dozens of artists 4. Q: What time does it take to produce a shot? A: Production time, budget time, and creation time |

The left side is an article, and the right side is some manually annotated questions and answers. The automatic question-and-answer model answers the questions on the right side by reading the text on the left side. Existing high-quality automatic question-and-answer models are generally pre-trained using the BERT, and then fine tuning is performed on a specific question-and-answer corpus to achieve a better performance. At present, on a specific set, the performance of the automatic question-and-answer model having the best performance achieves the level of a human being, and thus, the automatic question-and-answer model may be used as an evaluation approach to perform the translation evaluation.

Specific schemes are as follows.

A. For an oral translation article that needs to be tested, a batch of automatic question-and-answer corpora are respectively constructed.

B. The automatic question-and-answer corpora are used as training samples to train a high-performance automatic question-and-answer model, such that the automatic question-and-answer model achieves a high score A on the automatic question-and-answer corpus on the basis of reading of a standard translation article.

C. A to-be-evaluated translation is read using the automatic question-and-answer model, to obtain at least one group of questions and answers.

Step 306, determining a proportion of correct answers in the at least one group of questions and answers as a question-and-answer score.

In this embodiment, the question and answer extracted through the automatic question-and-answer model are not necessarily accurate. Therefore, it is required to calculate the proportion of the correct answers as a question-and-answer score B. For example, if there are 10 questions and 8 answers are correct, the question-and-answer score is 0.8.

Step 307, acquiring a standard score obtained by performing, by the automatic question-and-answer model, an answering result analysis on a standard translation.

In this embodiment, after the training for the automatic question-and-answer model is completed, the performance of the model may be verified through the standard translation to obtain a standard score A.

Step 308, correcting the question-and-answer score through the standard score to obtain an intelligibility score of the to-be-evaluated translation.

In this embodiment, the score of the automatic question-and-answer is obtained by calculating the score $(A-B+C)/A$, to evaluate an intelligibility. Here, C is generally a constant (e.g., 50), for smoothing the score difference between A and B.

Step 309, using a weighted sum of the semantic similarity, the text similarity and the intelligibility score as a translation quality score.

In this embodiment, the weighted sum of the scores obtained in three ways is used as the translation quality score. A specific weight setting may be set as needed. For example, if the intelligibility is emphasized, the weight of the intelligibility score may be set higher than that of other items.

Figure 4:
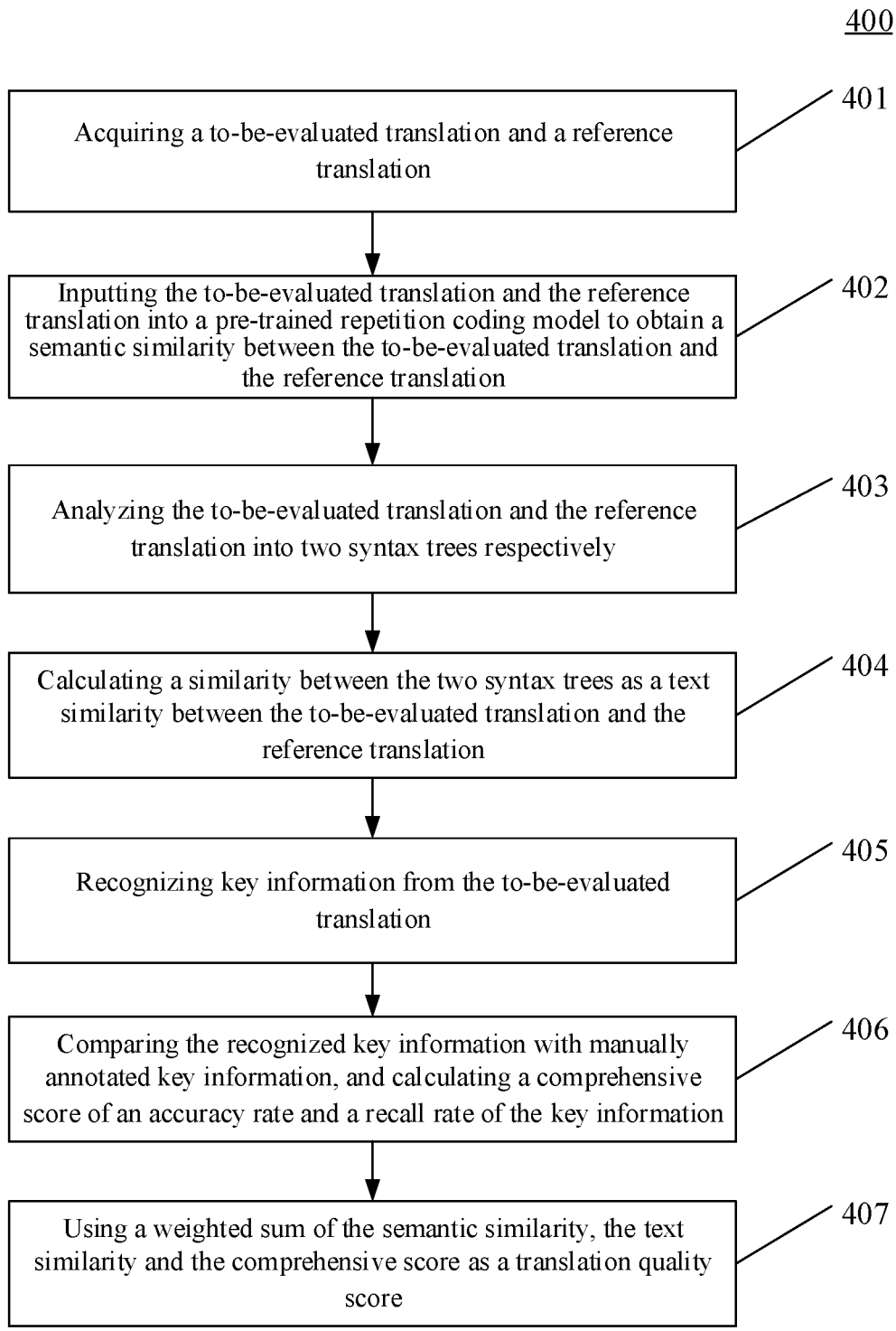
FIG. 4 is a flowchart of a method for evaluating a translation quality according to a third embodiment of the present disclosure.

Further referring to FIG. 4, FIG. 4 illustrates a flow 400 of a third embodiment of the method for evaluating a translation quality. The flow 400 of the method for evaluating a translation quality includes the following steps.

Step 401, acquiring a to-be-evaluated translation and a reference translation.

Step 402, inputting the to-be-evaluated translation and the reference translation into a pre-trained repetition coding model to obtain a semantic similarity between the to-be-evaluated translation and the reference translation.

Step 403, analyzing the to-be-evaluated translation and the reference translation into two syntax trees respectively.

Step 404, calculating a similarity between the two syntax trees as a text similarity between the to-be-evaluated translation and the reference translation.

Steps 401-404 are substantially the same as steps 201-204, which will not be repeatedly described.

Step 405, recognizing key information from the to-be-evaluated translation.

In this embodiment, the key information may include an entity, an abstract, etc. The key information in the to-be-evaluated translation may be manually annotated in advance. For example, a named entity (including time, a date, a place, a person name, etc.) in the translation needs to be annotated. Next, an important content fragment like abstract information in the translation needs to be annotated. Then, the entity in the translation may be recognized through the NER (Named Entity Recognition) technique, to be compared with the manually annotated entity. An abstract of the translation is extracted through an abstract generation tool.

Step 406, comparing the recognized key information with manually annotated key information, and calculating a comprehensive score of an accuracy rate and a recall rate of the key information.

In this embodiment, the entity in the translation that is recognized through the NER (Named Entity Recognition) technique is compared with the manually annotated entity. The abstract of the translation that is extracted through the abstract generation tool is compared with the manually annotated abstract. The accuracy rate and the recall rate of the key information recognized by the machine are calculated. When calculating the score, a standard F value is used. That is, the accuracy rate and recall rate of the key information between the translation and the standard translation are measured. The final score is used as the comprehensive score.

Step 407, using a weighted sum of the semantic similarity, the text similarity and the comprehensive score as a translation quality score.

In this embodiment, the weighted sum of the above three scores is used as the translation quality score.

Figure 5:
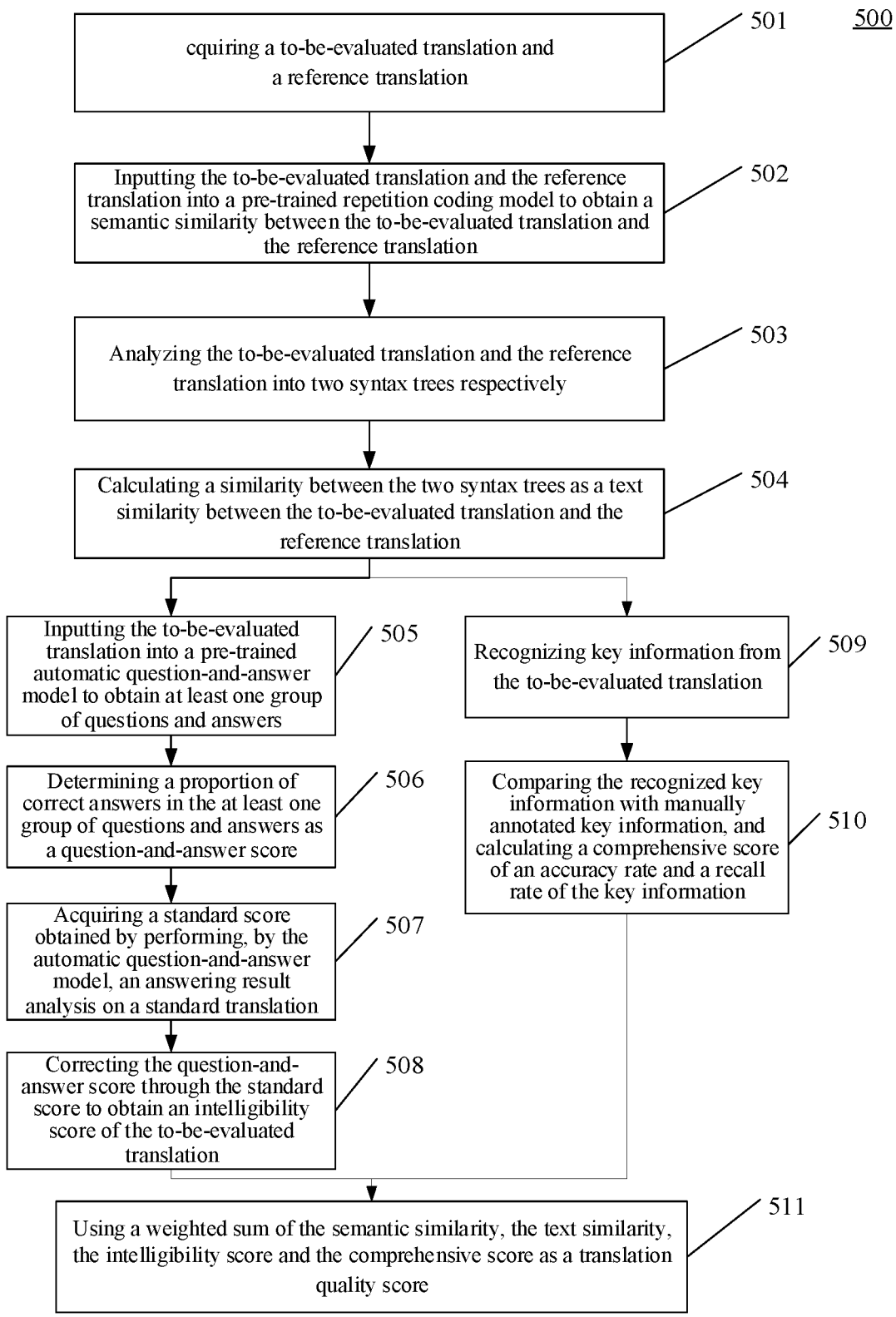
FIG. 5 is a flowchart of a method for evaluating a translation quality according to a fourth embodiment of the present disclosure.

Further referring to FIG. 5, FIG. 5 illustrates a flow 500 of a fourth embodiment of the method for evaluating a translation quality. The flow 500 of the method for evaluating a translation quality includes the following steps.

Step 501, acquiring a to-be-evaluated translation and a reference translation.

Step 502, inputting the to-be-evaluated translation and the reference translation into a pre-trained repetition coding model to obtain a semantic similarity between the to-be-evaluated translation and the reference translation.

Step 503, analyzing the to-be-evaluated translation and the reference translation into two syntax trees respectively.

Step 504, calculating a similarity between the two syntax trees as a text similarity between the to-be-evaluated translation and the reference translation.

Step 505, inputting the to-be-evaluated translation into a pre-trained automatic question-and-answer model to obtain at least one group of questions and answers.

Step 506, determining a proportion of correct answers in the at least one group of questions and answers as a question-and-answer score.

Step 507, acquiring a standard score obtained by performing, by the automatic question-and-answer model, an answering result analysis on a standard translation.

Step 508, correcting the question-and-answer score through the standard score to obtain an intelligibility score of the to-be-evaluated translation.

Steps 501-508 are substantially the same as steps 301-308, which will not be repeatedly described.

Step 509, recognizing key information from the to-be-evaluated translation.

Step 510, comparing the recognized key information with manually annotated key information, and calculating a comprehensive score of an accuracy rate and a recall rate of the key information.

Steps 509-510 are substantially the same as steps 405-406, which will not be repeatedly described.

Step 511, using a weighted sum of the semantic similarity, the text similarity, the intelligibility score and the comprehensive score as a translation quality score.

In this embodiment, the weighted sum of the four scores is used as the translation quality score. By using the scores of the above four indexes, the translation may be evaluated from a plurality of dimensions. In practical application, a different dimension may be selected as needed, to select a different system.

Figure 6:
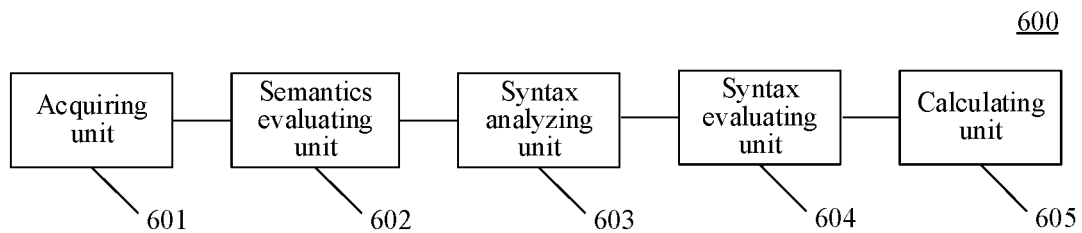
FIG. 6 is a schematic structural diagram of an apparatus for evaluating a translation quality according to an embodiment of the present disclosure.

Further referring to FIG. 6, as an implementation of the method shown in the above drawings, an embodiment of the present disclosure provides an apparatus for evaluating a translation quality. The embodiment of the apparatus corresponds to the embodiment of the method shown in FIG. 2, and the apparatus may be applied in various electronic devices.

As shown in FIG. 6, the apparatus 600 for evaluating a translation quality in this embodiment includes: an acquiring unit 601, a semantics evaluating unit 602, a syntax analyzing unit 603, a syntax evaluating unit 604 and a calculating unit 605. Here, the acquiring unit 601 is configured to acquire a to-be-evaluated translation and a reference translation. The semantics evaluating unit 602 is configured to input the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences. The syntax analyzing unit 603 is configured to analyze the to-be-evaluated translation and the reference translation into two syntax trees respectively. The syntax evaluating unit 604 is configured to calculate a similarity between the two syntax trees as a text similarity between the to-be-evaluated translation and the reference translation. The calculating unit 605 is configured to use a weighted sum of the semantic similarity and the text similarity as a translation quality score.

In this embodiment, for specific processes of the acquiring unit 601, the semantics evaluating unit 602, the syntax analyzing unit 603, the syntax evaluating unit 604 and the calculating unit 605 in the apparatus 600 for evaluating a translation quality, reference may be made to step 201, step 202, step 203, step 204 and step 205 in the corresponding embodiment of FIG. 2.

In some alternative implementations of this embodiment, the apparatus 600 further includes an intelligibility evaluating unit (not shown in the drawings). The intelligibility evaluating unit is configured to: input the to-be-evaluated translation into a pre-trained automatic question-and-answer model to obtain at least one group of questions and answers, the automatic question-and-answer model being a neural network for extracting a question and an answer in a text; determine a proportion of correct answers in the at least one group of questions and answers as a question-and-answer score; acquire a standard score obtained by performing, by the automatic question-and-answer model, an answering result analysis on a standard translation; correct the question-and-answer score through the standard score to obtain an intelligibility score of the to-be-evaluated translation; and use a weighted sum of the semantic similarity, the text similarity and the intelligibility score as the translation quality score.

In some alternative implementations of this embodiment, the apparatus 600 further includes a key information evaluating unit (not shown in the drawings). The key information evaluating unit is configured to: recognize key information from the to-be-evaluated translation; compare the recognized key information with manually annotated key information, and calculate a comprehensive score of an accuracy rate and a recall rate of the key information; and correct the translation quality score through the comprehensive score.

In some alternative implementations of this embodiment, the intelligibility evaluating unit is further configured to: set a predetermined constant to smooth a difference between the standard score and the question-and-answer score.

In some alternative implementations of this embodiment, the apparatus 600 further includes a training unit (not shown in the drawings). The training unit is configured to: acquire a set of original sentences of a first language identical to a language of the to-be-evaluated translation; for each original sentence of the first language in the set of the original sentences of the first language, translate the original sentence of the first language into a translation of a second language through a first translation model, translate the translation of the second language into a repetition sentence of the first language through a second translation model, constitute a repetition sentence pair using the original sentence of the first language and the repetition sentence of the first language, and select randomly one sentence to constitute a non-repetition sentence pair using the one sentence and the original sentence of the first language; and use a set of repetition sentence pairs as positive samples and the non-repetition sentence pair as a negative sample, and train a classifier using a machine learning apparatus to obtain the repetition coding model.

In some alternative implementations of this embodiment, the training unit is further configured to: control a size of a vocabulary table of the first translation model and a size of a vocabulary table of the second translation model, to generate a variety of repetition sentence pairs.

In some alternative implementations of this embodiment, a training sample set of the repetition coding model is different from a training sample set of the first translation model, and is also different from a training sample set of the second translation model.

In some alternative implementations of this embodiment, in response to determining that the to-be-evaluated translation is in a predetermined mainstream language, a BERT model is used as the repetition coding model.

Figure 7:
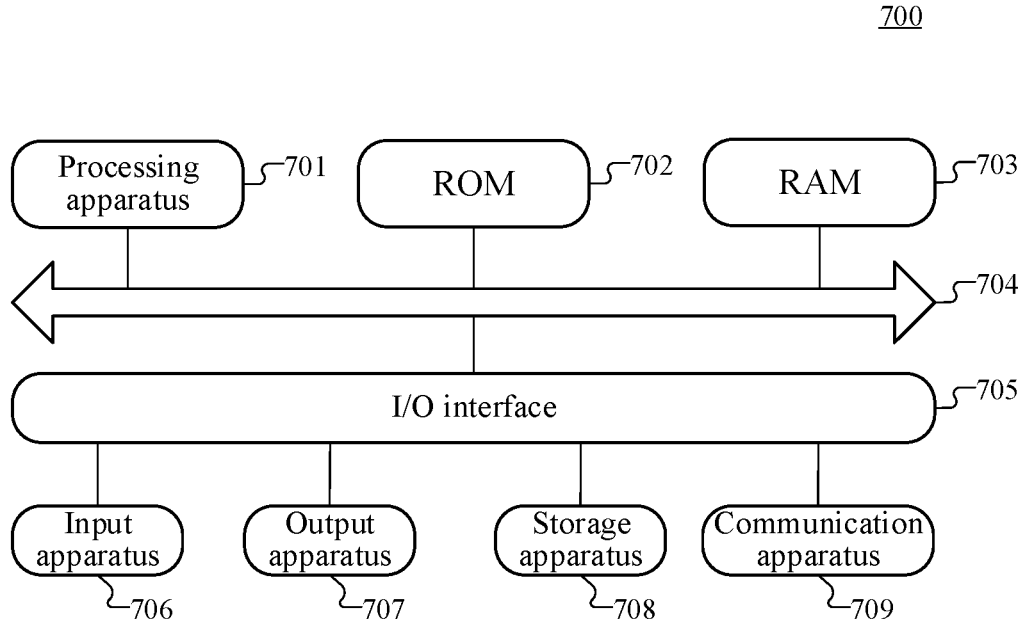
FIG. 7 is a schematic structural diagram of a computer system adapted to implement an electronic device according to embodiments of the present disclosure.

Referring to FIG. 7, FIG. 7 is a schematic structural diagram of an electronic device (e.g., the server or the terminal device in FIG. 1) 700 adapted to implement embodiments of the present disclosure. The terminal device in embodiments of the present disclosure may include, but not limited to, a mobile terminal such as a mobile phone, a notebook computer, a digital broadcast receiver, a PDA (personal digital assistant), a PAD (tablet computer), a PMP (portable multimedia player) and a vehicle-mounted terminal (e.g., a vehicle-mounted navigation terminal), and a fixed terminal such as a digital TV and a desktop computer. The terminal device/server shown in FIG. 7 is merely an example, and should not bring any limitations to the functions and the scope of use of embodiments of the present disclosure.

As shown in FIG. 7, the electronic device 700 may include a processing apparatus (e.g., a central processing unit and a graphics processing unit) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses are connected to the I/O interface 705: an input apparatus 706 including, for example, a touch screen, a touch pad, a keyboard, a mouse, a camera, a microphone, an accelerometer and a gyroscope; an output apparatus 707 including, for example, a liquid crystal display (LCD), a speaker and a vibrator; the storage apparatus 708 including, for example, a magnetic tape and a hard disk; and a communication apparatus 709. The communication apparatus 709 may allow the electronic device 700 to exchange data with other devices by means of a wireless communication or wired communication. Although FIG. 7 illustrates the electronic device 700 having various apparatuses, it should be understood that it is not required to implement or possess all of the shown apparatuses. More or fewer apparatuses may alternatively be implemented or possessed. Each block shown in FIG. 7 may represent one apparatus, or may represent a plurality of apparatuses as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 709, may be installed from the storage apparatus 708, or may be installed from the ROM 702. The computer program, when executed by the processing apparatus 701, implements the above mentioned functionalities defined in the method of embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be the computer readable medium included in the electronic device, or a stand-alone computer readable medium not assembled into the electronic device. The computer readable medium carries one or more programs. The one or more programs, when executed by the electronic device, cause the electronic device to: acquire a to-be-evaluated translation and a reference translation; input the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences; analyze the to-be-evaluated translation and the reference translation into two syntax trees respectively through a syntax analyzer; calculate a similarity between the two syntax trees as a text similarity between the to-be-evaluated translation and the reference translation; and use a weighted sum of the semantic similarity and the text similarity as a translation quality score.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including an acquiring unit, a semantics evaluating unit, a syntax analyzing unit, a syntax evaluating unit and a calculating unit. Here, the names of these units do not in some cases constitute a limitation to such units themselves. For example, the acquiring unit may alternatively be described as "a unit for acquiring a to-be-evaluated translation and a reference translation."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for evaluating a translation quality, comprising:
    acquiring a to-be-evaluated translation and a reference translation;
    inputting the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences;
    analyzing the to-be-evaluated translation and the reference translation into two syntax trees respectively;
    calculating a similarity between the two syntax trees as a text similarity between the to-be-evaluated translation and the reference translation; and
    using a weighted sum of the semantic similarity and the text similarity as a translation quality score;
    wherein the repetition coding model is trained by:
    acquiring a set of original sentences of a first language identical to a language of the to-be-evaluated translation;
    for each original sentence of the first language in the set of the original sentences of the first language, translating the original sentence of the first language into a translation of a second language through a first translation model, translating the translation of the second language into a repetition sentence of the first language through a second translation model, constituting a repetition sentence pair using the original sentence of the first language and the repetition sentence of the first language, and selecting randomly one sentence to constitute a non-repetition sentence pair using the one sentence and the original sentence of the first language; and
    using a set of repetition sentence pairs as positive samples and the non-repetition sentence pair as a negative sample, and training a classifier using a machine learning method to obtain the repetition coding model.

2. The method according to claim 1, further comprising:
    inputting the to-be-evaluated translation into a pre-trained automatic question-and-answer model to obtain at least one group of questions and answers, the automatic question-and-answer model being a neural network for extracting a question and an answer in a text;
    determining a proportion of correct answers in the at least one group of questions and answers as a question-and-answer score;
    acquiring a standard score obtained by performing, by the automatic question-and-answer model, an answering result analysis on a standard translation;
    correcting the question-and-answer score through the standard score to obtain an intelligibility score of the to-be-evaluated translation; and
    using a weighted sum of the semantic similarity, the text similarity and the intelligibility score as the translation quality score.

3. The method according to claim 2, wherein the correcting the question-and-answer score through the standard score comprises:
    setting a predetermined constant to smooth a difference between the standard score and the question-and-answer score.

4. The method according to claim 1, further comprising:
recognizing key information from the to-be-evaluated translation;
comparing the recognized key information with manually annotated key information, and calculating a comprehensive score of an accuracy rate and a recall rate of the key information; and
correcting the translation quality score through the comprehensive score.

5. The method according to claim 1, further comprising:
controlling a size of a vocabulary table of the first translation model and a size of a vocabulary table of the second translation model, to generate a variety of repetition sentence pairs.

6. The method according to claim 1, wherein a training sample set of the repetition coding model is different from a training sample set of the first translation model, and is also different from a training sample set of the second translation model.

7. The method according to claim 1, wherein in response to determining that the to-be-evaluated translation is in a predetermined mainstream language, a BERT model is used as the repetition coding model.

8. An apparatus for evaluating a translation quality, comprising:
at least one processor; and
a memory storing instructions, the instructions when executed by the at least one processor, causing the at least one processor to perform operations, the operations comprising:
acquiring a to-be-evaluated translation and a reference translation;
inputting the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences;
analyzing the to-be-evaluated translation and the reference translation into two syntax trees respectively;
calculating a similarity between the two syntax trees as a text similarity between the to-be-evaluated translation and the reference translation; and
using a weighted sum of the semantic similarity and the text similarity as a translation quality score;
wherein the repetition coding model is trained by:
acquiring a set of original sentences of a first language identical to a language of the to-be-evaluated translation;
for each original sentence of the first language in the set of the original sentences of the first language, translating the original sentence of the first language into a translation of a second language through a first translation model, translating the translation of the second language into a repetition sentence of the first language through a second translation model, constituting a repetition sentence pair using the original sentence of the first language and the repetition sentence of the first language, and selecting randomly one sentence to constitute a non-repetition sentence pair using the one sentence and the original sentence of the first language; and
using a set of repetition sentence pairs as positive samples and the non-repetition sentence pair as a negative sample, and training a classifier using a machine learning apparatus to obtain the repetition coding model.

9. The apparatus according to claim 8, the operations further comprising:
inputting the to-be-evaluated translation into a pre-trained automatic question-and-answer model to obtain at least one group of questions and answers, the automatic question-and-answer model being a neural network for extracting a question and an answer in a text;
determining a proportion of correct answers in the at least one group of questions and answers as a question-and-answer score;
acquiring a standard score obtained by performing, by the automatic question-and-answer model, an answering result analysis on a standard translation;
correcting the question-and-answer score through the standard score to obtain an intelligibility score of the to-be-evaluated translation; and
using a weighted sum of the semantic similarity, the text similarity and the intelligibility score as the translation quality score.

10. The apparatus according to claim 9, wherein the correcting the question-and-answer score through the standard score comprises:
setting a predetermined constant to smooth a difference between the standard score and the question-and-answer score.

11. The apparatus according to claim 8, the operations further comprising:
recognizing key information from the to-be-evaluated translation;
comparing the recognized key information with manually annotated key information, and calculate a comprehensive score of an accuracy rate and a recall rate of the key information; and
correcting the translation quality score through the comprehensive score.

12. The apparatus according to claim 8, wherein the operations further comprising:
controlling a size of a vocabulary table of the first translation model and a size of a vocabulary table of the second translation model, to generate a variety of repetition sentence pairs.

13. The apparatus according to claim 8, wherein a training sample set of the repetition coding model is different from a training sample set of the first translation model, and is also different from a training sample set of the second translation model.

14. The apparatus according to claim 8, wherein in response to determining that the to-be-evaluated translation is in a predetermined mainstream language, a BERT model is used as the repetition coding model.

15. A non-transitory computer readable medium, storing a computer program, wherein the program, when executed by a processor, causes the processor to perform operations, the operations comprising:
acquiring a to-be-evaluated translation and a reference translation;
inputting the to-be-evaluated translation and the reference translation into a pre-trained repetition coding model to obtain a semantic similarity between the to-be-evaluated translation and the reference translation, the repetition coding model being a neural network for calculating a probability of a pair of sentences being repetition sentences;
analyzing the to-be-evaluated translation and the reference translation into two syntax trees respectively;

calculating a similarity between the two syntax trees as a text similarity between the to-be-evaluated translation and the reference translation; and using a weighted sum of the semantic similarity and the text similarity as a translation quality score;

wherein the repetition coding model is trained by:

acquiring a set of original sentences of a first language identical to a language of the to-be-evaluated translation;

for each original sentence of the first language in the set of the original sentences of the first language, translating the original sentence of the first language into a translation of a second language through a first translation model, translating the translation of the second language into a repetition sentence of the first language through a second translation model, constituting a repetition sentence pair using the original sentence of the first language and the repetition sentence of the first language, and selecting randomly one sentence to constitute a non-repetition sentence pair using the one sentence and the original sentence of the first language; and using a set of repetition sentence pairs as positive samples and the non-repetition sentence pair as a negative sample, and training a classifier using a machine learning apparatus to obtain the repetition coding model.

* * * * *